May 12, 1959 K. A. MATTHEWS ET AL 2,886,739
ELECTRONIC DISTRIBUTOR DEVICES
Filed Oct. 20, 1952 2 Sheets-Sheet 1

Inventor
K. A. MATTHEWS—
R. A. HYMAN
By Philip M. Bolton
Attorney

Inventor
K. A. MATTHEWS –
R. A. HYMAN
By Philip M. Bolton
Attorney

United States Patent Office 2,886,739

Patented May 12, 1959

2,886,739

ELECTRONIC DISTRIBUTOR DEVICES

Kenneth Albert Matthews and Robert Anthony Hyman, London, England, assignors to International Standard Electric Corporation, New York, N.Y.

Application October 20, 1952, Serial No. 315,728

Claims priority, application Great Britain October 24, 1951

16 Claims. (Cl. 315—12)

This invention relates to electrical arrangements for detecting energy-bearing rays or particles, and the principal object is to increase the amplitude of the currents or pulses obtained in response to such rays or particles. The invention has particular application to improvements in electronic distributor systems.

Perhaps the simplest form of electronic distributor tube consists of a cathode ray tube in which the fluorescent screen is replaced by a number of separate target electrodes. The electron beam is caused to sweep over the targets by applying a suitable periodic wave to the beam-deflecting elements of the tube, and then a current may be drawn from each target when the beam strikes it. With this simple arrangement, the currents which can be drawn from the targets are generally very small, and frequently amplification is necessary. Larger currents may be obtained by using targets of the secondary electron emitting type, but still the currents obtainable are small.

Much larger currents may be obtained according to the present invention by taking advantage of the properties of certain semiconducting materials or crystals such as germanium, which have been employed for electric rectifiers and crystal triodes by providing one or more point-contact electrodes or catswhiskers.

In an electronic distributor system, the targets can be regarded as devices for detecting the presence of the electron beam. The devices used as targets according to the invention can also be used for detecting other kinds of rays containing electrical energy, such as light rays or alpha particles.

The rectifiers and crystal triodes mentioned above are generally made from N-type semi-conductors; that is, from semi-conductors in which the conduction of current is by means of a few free electrons. Semi-conductors can also be of the P-type, in which conduction of current is by means of a few electron deficiencies called positive holes. If the semi-conductor is a quadrivalent element such as germanium or silicon, these conducting properties may be produced by small amounts of impurity in the semiconductor, which are of the donor type (such as arsenic or phosphorous) if an N-type material is required, or of the acceptor type (such as aluminum) if a P-type material is required. The same body of material can consist partly of N-type material and partly of P-type material. The body can be constructed so that the two portions adjoin one another on either side of a dividing line or surface which for convenience will be called a "P–N junction."

The invention according to its broadest aspect provides an arrangement for detecting energy-bearing rays or particles comprising a body of a semiconductor having a continuous crystalline structure, two different portions of the body being separated by a barrier or junction and having respectively P- and N-type conductivity, a direct current source for applying a bias potential between the said portions with such polarity as to bias the barrier or junction into the high resistance condition, means for directing the rays or particles on to the surface of the body in the neighbourhood of the said barrier or junction, and means for indicating or measuring the resulting change in current supplied by the said source to the body.

The expression "barrier or junction" as used above is considered as the region immediately at the line of joining of the two types of semi-conductors. Thus where only one of the terms is used it will be understood to cover this same element.

According to other aspects of the invention, one or more target electrodes, each consisting of a semi-conductor body with a P–N junction polarised in the high resistance condition may be provided in an electron beam tube for giving response when the beam strikes a target in the neighbourhood of the junction. The arrangement may be used as an electronic distributor, as a pulse counting device, or as a two-condition trigger device, for example.

The invention will be described with reference to the accompanying drawing, in which.

Figures 1, 2, 3, 4, 5, 6, 7, 8:
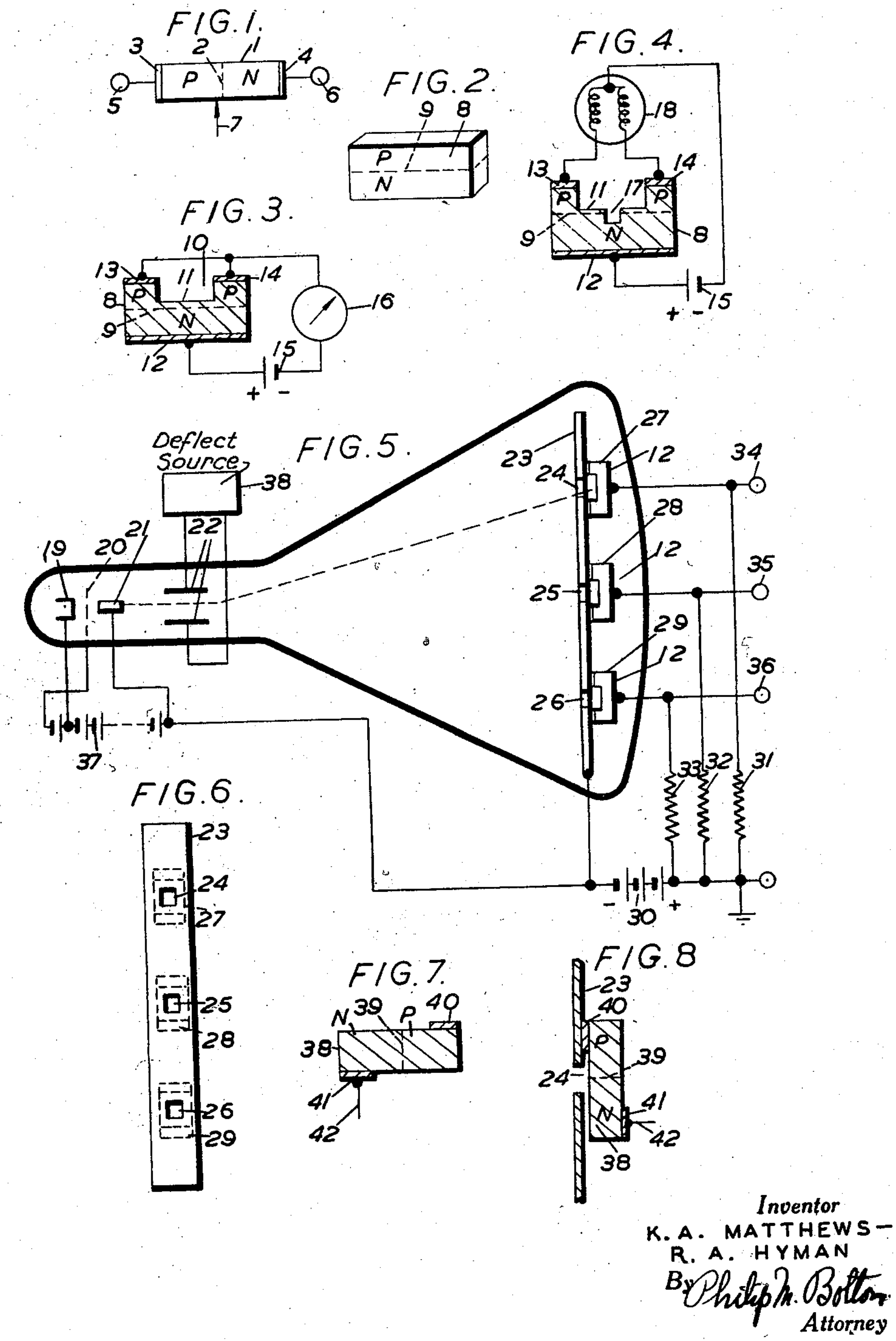
Fig. 1 shows a diagram of a semiconducting substance used to explain the principle of the invention.
Fig. 2 shows a perspective view of a block or crystal of a semiconductor having a P–N junction.
Fig. 3 shows a ray detector circuit according to the invention including a sectional view of a ray detector device having a P–N junction and constructed from a block such as that shown in Fig. 2.
Fig. 4 shows a modification of Fig. 3.
Fig. 5 shows an electronic distributor system including a cathode ray tube having target electrodes consisting of devices similar to that shown in Fig. 3.
Fig. 6 shows a detail of the tube shown in Fig. 5.
Fig. 7 shows an alternative type of target electrode.
Fig. 8 shows a detail modification of the tube shown in Fig. 5, in order to utilise this alternative type of target-electrode.

As already mentioned, the invention depends on the use of a germanium or other semiconductor body capable of exhibiting both P- and N-type conductivity. In Fig. 1 there is diagrammatically shown a block 1 of such a semiconductor which has been prepared in known manner so that the left hand portion labelled P has P-type conductivity and the right hand portion labelled N has N-type conductivity. The two portions are separated by a P–N junction, which is a very thin transition region or barrier indicated by the dotted line 2. The change in the type of conductivity should occur at the barrier 2 without breaking the crystalline continuity of the block. A germanium block of this kind may be prepared in the manner described on page 637 of the Physical Review, February 15, 1951. Electrodes 3, 4 in the form of metal coatings, for example, are applied to opposite ends of the block and may be supposed to be connected to corresponding terminals 5, 6.

In the P-type region there are a few atoms which are deficient in electrons, that is, electrons are missing, leaving what are called "positive holes." Thus, if an electric field is applied to the semiconductor, electrons will be handed along from one atom to another to fill up the positive holes, and the effect is substantially as though the positive holes migrate in the same direction as the electric field and are therefore responsible for the conduction of the current in P-type material.

In the N-type region there are a few atoms which have extra electrons, and on the application of an electric field the extra electrons migrate in the opposite direction to the electric field and are thus responsible for the conduction of the current in the N-type material.

It follows that if in Fig. 1, terminal 5 be made positive to terminal 6, positive holes will be driven across the barrier 2 towards the right to be neutralised by electrons driven across the barrier towards the left, and a relatively large current flows. The semiconductor presents a relatively low resistance in this condition.

However, if terminal 6 is made positive to terminal 5, both positive holes and electrons will be driven away from the barrier and from each other, and there is nothing to conduct current across the barrier, so very little current can flow. Therefore, the semiconductor presents a relatively high resistance in this condition.

The explanation given so far with reference to Fig. 1 is a very brief summary of what is usually accepted as the action of a P–N junction in a semiconductor.

If sufficient energy is supplied in some way to an electron forming part of an atom of the semiconductor, the electron may be removed from the atom, thus creating an electron-positive-hole pair. In the case of germanium, the energy required to do this is about 0.75 electron volt. Thus energy may be supplied by directing on the semiconductor a light ray of appropriate wavelength, or an electron beam, or beta rays of sufficient energy, or alpha rays, or gamma rays. Such electron-positive-hole pairs may also be produced by thermal agitation.

Thus if a semiconductor having a P–N junction is polarised in the high resistance direction so that practically no current flows, and an electron beam, for example, is directed on to the surface of the semiconductor, as indicated by the arrow 7 in Fig. 1, a number of electron-positive-hole pairs will be produced so that mobile charges are now provided for conducting the current. If the beam is directed on to the P-type portion, the electrons produced will migrate over the barrier towards terminal 6 and the positive holes will migrate towards terminal 5. Likewise, if the beam is directed on to the N-type portion, the positive holes produced will migrate across the barrier towards terminal 5 and the electrons will move towards terminal 6. In either case a large increase in the current between terminals 5 and 6 will be produced.

However, when the electron-positive-hole pairs are produced, they are likely very soon to recombine, and so they should be produced as near as possible to the barrier 2 so that the electrons, or positive holes as the case may be, travel across the barrier before appreciable recombination can occur.

The invention utilises this principle to detect an energy-bearing ray or particle by causing it to produce electron-positive-hole pairs in a semiconductor having a P–N junction, which is biased in the reverse or high resistance direction.

It should be explained that bombardment of a germanium crystal rectifier by electrons or other rays for producing electron-positive-hole pairs is known, for example, from the letter by Moore and Herman on page 472 of the Physical Review, February 1, 1951. A major feature of the present invention is the utilisation of this process to increase the conductivity of a semiconductor having a P–N junction which is polarised in the reverse direction.

In the element shown in Fig. 1, however, the area of the semiconductor surface in the immediate neighbourhood of this junction, and accessible to the rays, is small. A preferred form is therefore shown in Figs. 2 and 3. A block of germanium 8 or other suitable semiconducting crystal is prepared in which the barrier 9 between the P and N regions is longitudinal instead of transverse, as in Fig. 1. A trough is cut out of the P-type region as indicated at 10, Fig. 3, by grinding, or in any other convenient way. The thickness of the P-type portion between the floor of the trough at 11 and the barrier 9 should be reduced to the smallest value practicable. A thickness of about 0.01 millimetre should be aimed at, though larger thicknesses up to say 0.5 millimetre could be used. A metal electrode 12 is plated or otherwise suitably applied over the base of the N-type portion and two other similar electrodes 13 and 14 are likewise applied to the upstanding P-type portions on either side of the trough.

If now an electron beam or light ray is directed upon the floor 11 of the trough, electron-positive-hole pairs will be produced as already explained. But since the P-type portion is here so thin, these pairs will be produced very close to the barrier 9 and if the electrodes 13 and 14 are polarised negatively to the base electrode 12, for example by means of a direct current source 15 connected as indicated, the electrons will be swept quickly into the N-type region before recombination can take place. It will be noted that by this design electron-positive-hole pairs can be produced over a relatively large area immediately adjacent to the barrier 9 so that a large conduction current can be produced with a diffuse electron beam.

It will be evident that if a direct current measuring instrument or meter 16 be connected in series with the source 15 as shown in Fig. 3, the arrangement can be used to detect, and measure the intensity of, an electron beam, or light ray, or stream of alpha particles or other rays directed or focussed on the floor 11 of the trough 10. By replacing the meter 16 by a relay and counting circuit (not shown), fast electrons or alpha particles arriving singly could be counted.

Fig. 4 shows a modification of the device shown in Fig. 3, in which a narrow slot 17 is cut through the thin P-type layer on the floor of the trough 10, thereby producing effectively two separate ray detectors on the same germanium crystal, which can be separately polarised from the source 15, for example, through the windings of a differential meter 18, to indicate the difference in intensity of two beams or rays applied respectively to the two detectors.

It will be understood that the P- and N-portions of the ray detectors shown in Figs. 3 and 4 could be interchanged, so that the device would then consist of a thin layer of N-type conductivity on a major portion of P-type conductivity. In this case of course the source 15 must be reversed.

Figs. 5 and 6 show the manner in which the devices described may be applied to a cathode ray distributor tube.

The tube comprises the usual conical envelope provided in the neck portion with a conventional electron gun comprising a cathode 19, a control electrode 20 and an accelerating electrode 21. A pair of deflecting plates 22 is also shown. These elements may be arranged in any convenient way, and the drawing does not indicate the details of the mounting arrangements, which are well known.

At the large end of the tube there is mounted a metal plate or strip 23 having three equally spaced small holes 24, 25, 26, each of which may for example be about 1 square millimetre in area. Behind these holes are respectively mounted targets 27, 28, 29 each of which consists of a device of the kind illustrated in Fig. 3. The electrodes 13, 14 (Fig. 3) of each target may be soldered or otherwise secured to the plate 23 (Fig. 5) on either side of the corresponding hole, so that the beam electrons which pass through the hole will strike the floor 11 of the trough. A polarising source 30 (Fig. 5) has its negative terminal connected to the plate 23 and its positive terminal to the base electrodes 12 of the three targets through individual load resistors 31, 32, 33. The three base electrodes are connected to corresponding output terminals 34, 35 and 36.

The electron beam is produced by the application of suitable potentials to the gun electrodes and to the plate 23 from a source 37, the arrangement being diagrammatically shown to indicate any convenient arrangement, and the beam may be deflected so as to sweep along the plate 23 by a suitable deflecting source 38 connected to the deflecting plates 22. Each time the beam passes through one of the holes 24, 25 or 26, and impinges on the corresponding target electrode at the back of the plate, the resistance of the electrode is greatly reduced and negative pulse of large amplitude will be produced at the corresponding output terminal 34, 35 or 36 on account of the potential drop resulting from the sudden rise of current in the corresponding load resistor 31, 32 or 33.

Although, for illustration, Fig. 5 shows only three target electrodes, it is clear that any number may be provided, with corresponding holes in the plate 23. Furthermore, it is not essential to arrange them in a straight line; they could for example be arranged round the circumference of a circular plate, means on conventional lines being provided for deflecting the electron beam so that it follows a corresponding circular path. The targets could also be arranged in a number of parallel lines on a square or rectangular plate, with means for scanning all the targets in turn in the manner of a television tube.

While the target electrodes of the tube shown in Fig. 5 are preferably of the form shown in Fig. 3, they could be of a type more like Fig. 1. Fig. 7 shows a semiconductor block 38 with a transverse P-N junction 39 dividing it into two halves. A relatively thick metal electrode 40 is secured to the upper surface of the P-type portion, while a base electrode 41, which need not be thick, is attached to the lower surface of the N-type portion. A conductor wire 42 may be soldered to the electrode 41.

Fig. 8 shows a section of part of the plate 23 of the tube shown in Fig. 5 to illustrate the manner of fixing a target of the type shown in Fig. 7. The plate 40 is soldered or otherwise firmly attached to the plate 23 in such manner that the barrier 39 comes opposite the centre of the hole 24 in the plate. The electrode 40 should be sufficiently thick to space the surface of the semiconductor block 38 away from the surface of the plate 23 so that no contact is made with the N-type portion. The plate 40 need not be more than about 0.1 millimetre thick.

It will be seen that an electron beam which passes through the hole 24 will strike the semiconductor block close to the barrier 39, thereby producing the electron-positive-hole pairs in the region where they are required.

If the targets are all of the type shown in Fig. 7 they may be fixed in the manner shown in Fig. 8, and the connections of the wires 42 to the circuit will be made as shown in Fig. 5.

In order to illustrate the advantage gained by the use of targets with P-N junctions in a cathode ray tube distributor according to the invention, a numerical, example will be given.

Let the potential of the source 37 in Fig. 5 be 5000 volts, and the beam current 20 microamperes. Let it also be supposed that there are ten targets arranged in a circle 10 centimetres in circumference, and that the beam sweeps all the targets in 10 microseconds.

Then the energy of ach electron striking the target will be 5,000 electron volts. Since as already stated, the energy required to produce one electron-positive-hole pair in germanium is 0.75 electron volt one beam electron could theoretically produce 6,666 such pairs. However, in practice it is found that in fact the efficiency of production of electron-positive-hole pairs is only about 7.5%. Accordingly each electron can only be assumed to produce about 500 such pairs. The electron multiplication is therefore 500. With the assumed rate of scan, the beam sweeps each target for approximately 0.1 microsecond (assuming that the holes in the plate 23, Fig. 5, are 1 millimetre square). Thus, multiplying the beam current of 20 microamperes by 500, it is clear that electrons are produced in each target at the rate of 10 milliamperes for 0.1 microsecond. In practice, the corresponding current across the barrier in the target will not be produced instantaneously, and the electrons so produced will be cleared away at a rather slower rate. For example, a current pulse of mean amplitude 1 milliampere and mean duration of 1 microsecond might be produced in this way. It should be pointed out that the multiplication (about 500) obtained in this case is very much higher than can be obtained with a secondary electron emitting target, where multiplication of the order of only about 3 is usually obtained.

One serious difficulty which has been encountered with cathode ray distributor tubes used for channel separation in multichannel communication systems is that of crosstalk between adjacent targets, which belong to different channels. In order to obtain sufficient current from the targets, even with secondary emission, a large beam current has to be used, and on account of the strong spreading tendency in beams with a large electron density it is very difficult to focus the beam sharply so that the electrons are substantially confined to one target at a time. By taking advantage of the present invention, very much smaller beam currents can be used, and the spreading difficulty and resulting crosstalk are therefore greatly reduced.

Figure 9:
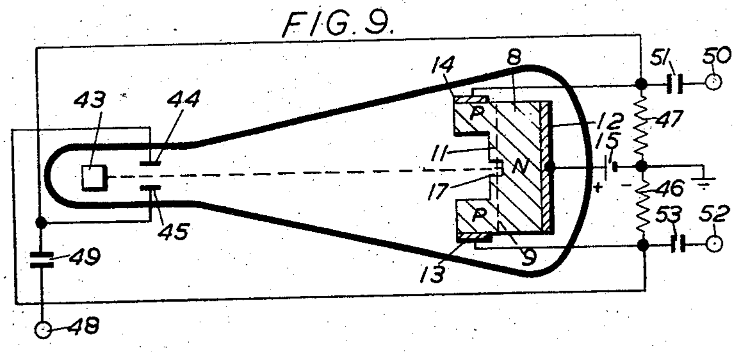
Fig. 9 shows an electron beam tube employing a target electrode of the kind shown in Fig. 4.

Fig. 9 shows an application of the device of Fig. 4 in an electron beam tube having an electron gun 43 of conventional type, and two deflecting electrodes 44 and 45. The arrangements for polarising the electrodes (not shown) of the gun are not indicated, and may be as shown in Fig. 5. The elements of the ray detector device have been given the same designations as in Fig. 4, the only slight modification being that the electrodes 13 and 14 are shown on the outsides of the upstanding P-type portions, instead of on the crests, for convenience in making the connections.

The polarising source 15 is connected to the electrodes 13 and 14 through respective equal resistors 46 and 47. The deflecting plates 44 and 45 are connected respectively to the electrodes 13 and 14. This arrangement will automatically centre the electron beam so that it strikes the insensitive slot 17. This is for the reason that if the beam should strike, for example, the upper portion of the floor 11, the relatively large current which flows to the electrode 14 from the source 15 through the resistor 47 will apply a positive potential to the deflecting plate 45, thus deflecting the beam downwards. In the opposite case, if the beam should strike the lower portion of the floor 11, a positive potential will now be applied to the plate 44 from resistor 46, and the beam will be deflected upwards. Thus any tendency for the beam to depart from the central position will be strongly resisted. Thus if, for example, a short negative pulse be applied to a terminal 48 connected to the plate 45 through a blocking capacitor 49 the beam will momentarily be deflected upwards, and a positive output pulse can be obtained from an output terminal 50 connected to the plate 45 through a blocking capacitor 51. On the disappearance of the applied pulse, the beam will be automatically centred again on the slot 17. If a positive input pulse be applied, the beam will be deflected in the opposite direction, and the output pulse can then be obtained from a terminal 52 connected to plate 44 through a blocking capacitor 53, the beam being afterwards automatically centered as before. The arrangement can thus be used for separating positive and negative pulses.

It should be noted that if the connections between the plates 44 and 45 and the resistors 46 and 47 be interchanged, and a negative pulse be applied to terminal 48, the beam will be strongly held in the upward deflected position, and if a positive pulse be afterwards applied, it will be switched to the downward position and there strongly held, from which it can be dislodged by the application of another negative pulse; and so on. The arrangement then forms a two-condition trigger circuit which is stable in both conditions.

Figure 10:
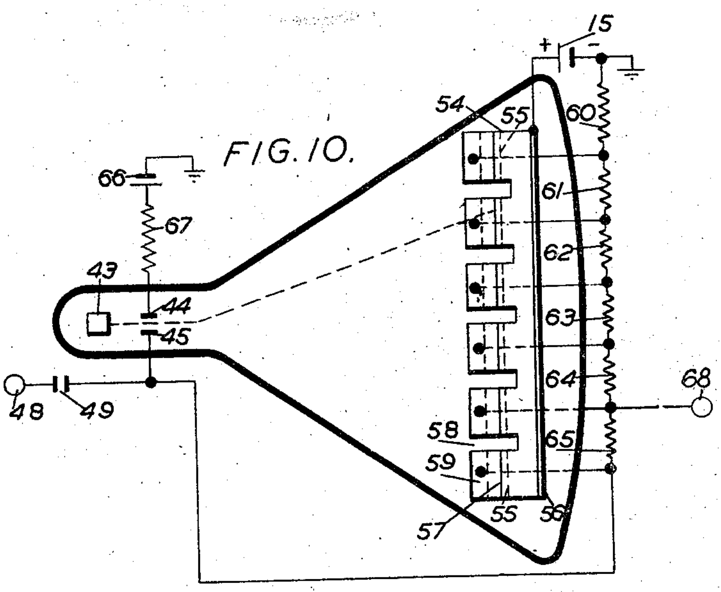
Fig. 10 shows a pulse counting circuit including an electron beam tube using a target electrode comprising a multiple ray detector device.
Figure 11:
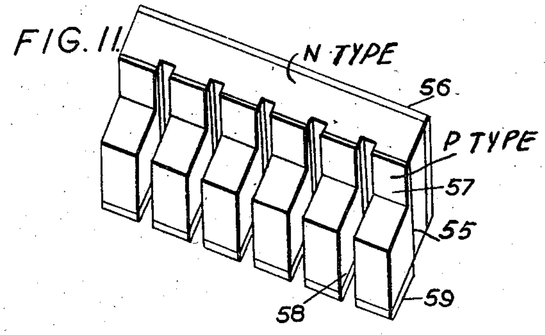
Fig. 11 shows a perspective front view of the multiple ray detector device used in Fig. 10.

Figs. 10 and 11 show the application of a multiple ray detector device which is a development of the device shown in Fig. 4. Fig. 10 shows a side elevation of the device arranged as a counting device inside an electron beam tube. Fig. 11 shows a perspective view of the device as seen from the electron gun of the tube.

The device consists of a rectangular block 54 of germanium, or other suitable semiconductor, divided into two portions with N and P conductivity respectively by a barrier shown dotted at 55. A base electrode 56 is applied to one surface of the N type portion, and the block is ground to an L-shaped cross-section as shown in Fig. 11, so that the surface 57 is separated from the barrier 55 by a thin layer of P-type conductivity. The block is then divided into six equal portions by five transverse slots 58 which cut through the barrier 55 as in the case of Fig. 4. To the back surface of each P-type portion (as seen in Fig. 10), is fixed an electrode 59 seen more clearly in Fig. 11. There are thus produced effectively, six separate ray detectors each having a separate P-N junction or barrier, and sharing in common the base portion of the N-type part of the block.

The device 54 is arranged in the tube to be scanned by the electron beam so that it strikes the floor 57 of each section in turn, when deflected by suitable potentials applied to the plates 44 and 45.

The polarizing source 15 is connected with its positive terminal to the base electrode 56 and its negative terminal to the earthed end of a chain of resistors 60 to 65, successive junction points of which are respectively connected in order to the electrodes 59 of the six ray detectors, by conductors which are shown dotted where they are supposed to pass behind the block. The end of resistor 65 remote from the source 15 is connected to the lower deflecting plate 45. The plate 45 is connected to an input terminal 48 through a capacitor 49 as in Fig. 9. A suitable earthed bias source 66 may also be connected to the upper plate 44 if necessary through a large resistor 67.

Suppose that the beam is directed on to the second ray detector counting from the top, as shown. The values of the resistors 60 and 61 should be chosen so that the positive potential applied to the plate 45 and derived from the current through the second device is such as to hold it stably in the deflected position. If now a positive pulse be applied to terminal 48 of sufficient amplitude to shift the beam downwards to the third ray detector, the deflecting current will now be derived from the third device and will flow through resistor 62 in addition to resistors 60 and 61. The positive potential applied to plate 45 is thus increased and the resistor 62 can be chosen so that it has the proper value to hold the beam in the new position. It is clear that with successive positive applied pulses, the beam can be stepped in like manner in turn on to each ray detector in a downward direction.

Furthermore, by applying negative pulses to the terminal 48 instead of positive pulses, the beam may clearly be stepped along the ray detector in turn in the upward direction. Evidently, if desired, negative pulses may be applied to the upper plate 44 for stepping the beam downwards, or positive pulses for stepping it upwards.

An output terminal 68 is shown connected to the junction point of resistors 64 and 65. This terminal may be connected to any suitable utilisation device, such as an indicating device (not shown) for giving an indication when a specified number of pulses has been counted, which in the example shown will be five. The terminal 68 could be connected to the junction point of any other pair of the resistors 60 to 65, according to the number of pulses which it is desired to count, and more than one of such output terminals could be provided, if desired.

In Fig. 10, the resistors 60 and 65 should preferably be small compared with the effective resistance of any ray detector when it is struck by the electron beam. Their values should be chosen so that the potential applied to the plate 45 is such as to hold the beam on any detector to which it has been shifted by an input pulse.

While the principles of the invention have been described above in connection with specific embodiments and particular modifications thereof, it is to be clearly understood that this description is made by way of example and not as a limitation on the scope of the invention.

What we claim is:

1. An arrangement for detecting energy-bearing rays comprising an energy-bearing ray beam source, a block of semi-conductor material having a continuous crystal structure, two different portions of the body being separated by a barrier and having respective P- and N-type conductivity, a direct current source means for applying a bias potential from said direct current source between the said portions with a polarity to bias the barrier into a high resistance condition, said block of semi-conductor material having a major portion of one of said conductivity types, and at least one minor portion of the other conductivity type, said minor portion comprising effectively a thin layer upon said major portion, separate conductive electrodes attached respectively to said major portion and to satd minor portion, means for directing said beam onto the surface of the body in the neighborhood of said barrier, said means for directing the beam comprising deflection means for deflecting said beam onto said thin layer, whereby a change in current is produced between said electrodes by the impingement of said ray in the neighborhood of said barrier, and means responsive to the resulting change in current for producing output energy.

2. An arrangement according to claim 1 in which the said block comprises the said major portion and a plurality of substantially rectangular thin layers of the said other conductivity type arranged side-by-side in line and separated from one another by slots which penetrate through the said barrier.

3. An arrangement according to claim 1 in which the semiconductor body comprises a block of semiconducting material in which the said barrier consists substantially of a plane section of the body, a trough cut through part of a first one of the said portions, the floor of the trough being substantially parallel to the said plane section, and the depth of the trough being such that a thin layer not exceeding 0.5 millimeter in thickness of the said first portion remains separated from the portion of the other conductivity type by the said barrier and in which said electrodes comprise a pair of metal electrodes secured to the surface of the first portion respectively on either side of the trough, and a further electrode secured to the surface of the other portion, said means being provided for directing the said rays on to the floor of the trough.

4. An arrangement according to claim 3 in which the first-mentioned electrodes are arranged substantially in the same plane.

5. An arrangement according to claim 3 in which the floor of the said trough has a slot through the said thin layer dividing said first portion into two separate parts, thereby producing effectively two separate barriers between the respective parts and the portion of the body of the opposite conductivity type.

6. An arrangement according to claim 5 in which the direct current source means is connected to bias separately said two separate barriers.

7. An arrangement according to claim 6 in which the said direct current source means includes a current indicating instrument having a pair of differential windings connected between one terminal of the said source and the said first-mentioned electrodes, respectively, the other terminal of the said source being connected to the said further electrode.

8. A circuit arrangement comprising an electron discharge tube including means for generating an electron beam, and a target electrode consisting of a semiconductor having a continuous crystalline structure, two different portions of the semiconductor being separated by a barrier, and having respectively P- and N-type conductivity, one of said portions comprising a thin layer upon the other portion the said arrangement further comprising a direct current source, means for applying a bias potential from said source between the said different portions with such polarity as to bias the barrier into the high-resistance condition, deflection means for causing the electrons of the said beam to impinge upon the thin layer of said target in the neighbourhood of the said barrier, and means for utilising the increase in current flowing through the semiconductor from the said source which results from the impinging of the electrons on the target.

9. An electronic distributor system comprising an electron beam tube having a plurality of targets, each of which consists of a semiconductor having a continuous crystalline structure, two different portions of the semiconductor being separated by a barrier and having respectively P- and N-type conductivity, a direct current source, means for applying a bias potential from said source between the said different portions of each target with such polarity as to bias the barrier into the high resistance condition, means for causing the electron beam to scan all the said targets in turn in such manner that the electrons impinge upon each of them in the neighbourhood of the said barrier, and means for deriving from each target an output pulse in response to the impinging thereon of the said electrons, each said target comprising a block of semiconducting material in which the said barrier consists substantially of a plane section of the body, a trough cut through part of the first one of the said portions, the floor of the trough being substantially parallel to the said plane section, and the depth of the trough being such that a thin layer not exceeding 0.5 millimetre in thickness of the said first portion remains separated from the portion of the other conductivity type by the said barrier or junction, a pair of metal electrodes secured to the first portion on either side of the trough, and a further electrode secured to the surface of the other portion, each target being so placed that the beam electrons impinge on the floor of the trough.

10. A system according to claim 9, in which the first-mentioned electrodes are arranged substantially in the same plane, and are secured to one side of a metal plate having a hole opposite the floor of the trough, the electron beam being arranged to scan the said holes in turn from the other side of the plate.

11. A system according to claim 10 in which one terminal of the said source is connected to the said further electrode of each target through a corresponding load resistor, the other terminal of the source being connected to the said metal plate, and in which an output circuit is connected to the said further electrode for deriving the corresponding output pulse therefrom.

12. An arrangement according to claim 6 in which the direct current source is arranged to bias the said two separate barriers through two respective equal resistors.

13. An arrangement according to claim 12 wherein said deflecting means comprises a pair of deflecting elements for selectively deflecting the electron beam to said minor portions.

14. An arrangement as claimed in claim 13, wherein said minor portion is comprised of two spaced sections, and wherein said deflecting means further comprising a resistive network coupled among said direct current source, said target electrodes and said deflecting elements, the potential drop across said network being applied to said deflecting elements whereby said beam is maintained substantially in the space between said minor portion sections.

15. An arrangement according to claim 13, further comprising a pair of output terminals wherein said resistive network comprises a pair of series connected resistors each having a terminal connected to one terminal of said source and the other terminal coupled to a different one of said deflecting elements and to different of said output terminals, said source having its other terminal connected to said target electrodes, the potential drop across said network being applied to said deflecting elements whereby said electron beam is maintained on that part of said minor portion to which it has been deflected.

16. An arrangement according to claim 2, in which said directing means includes means including a pair of deflecting elements for causing the electron beam to sweep across said rectangular minor portions in turn, said direct current source means comprising a voltage divider resistor network connecting said direct current source to said electrodes for biasing all the barriers between said minor portions to different potential values and the major portion of the crystal into the high resistance condition, further including an input terminal means for coupling one of said deflecting elements to said voltage divider network, whereby when said beam is deflected to a given electrode by the application of an input signal to said input terminal, said beam remains in said deflected position due to the current flow through that part of said divider network which is coupled to said given electrode and said direct current source, and means for applying an input pulse to step the beam from one of said minor portions to another minor portion.

References Cited in the file of this patent

UNITED STATES PATENTS

| | | |
|---|---|---|
| 2,504,628 | Benzer | Apr. 18, 1950 |
| 2,547,386 | Gray | Apr. 3, 1951 |
| 2,588,254 | Lark-Horowitz et al. | Mar. 4, 1952 |
| 2,588,292 | Rittner | Mar. 4, 1952 |
| 2,600,373 | Moore | June 10, 1952 |
| 2,629,800 | Pearson | Feb. 24, 1953 |
| 2,680,159 | Grover | June 1, 1954 |